No. 880,414. PATENTED FEB. 25, 1908.
A. R. SPRAGUE.
PROCESS FOR TEMPERATURE REGULATION.
APPLICATION FILED MAR. 22, 1906.
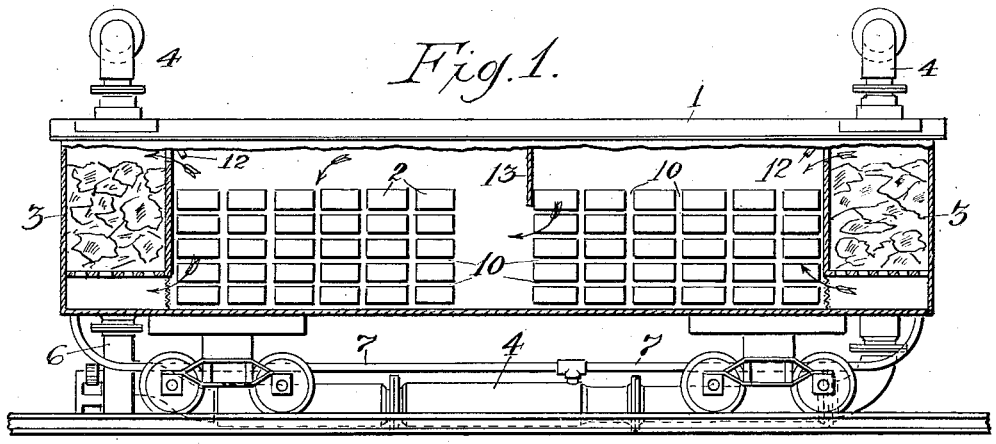
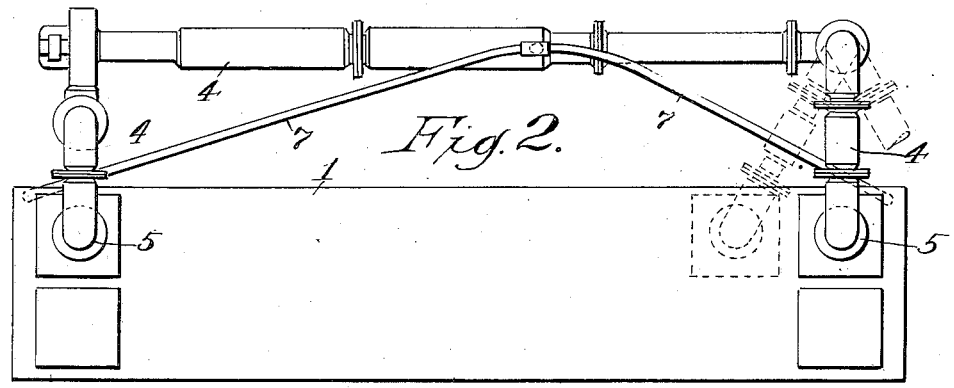
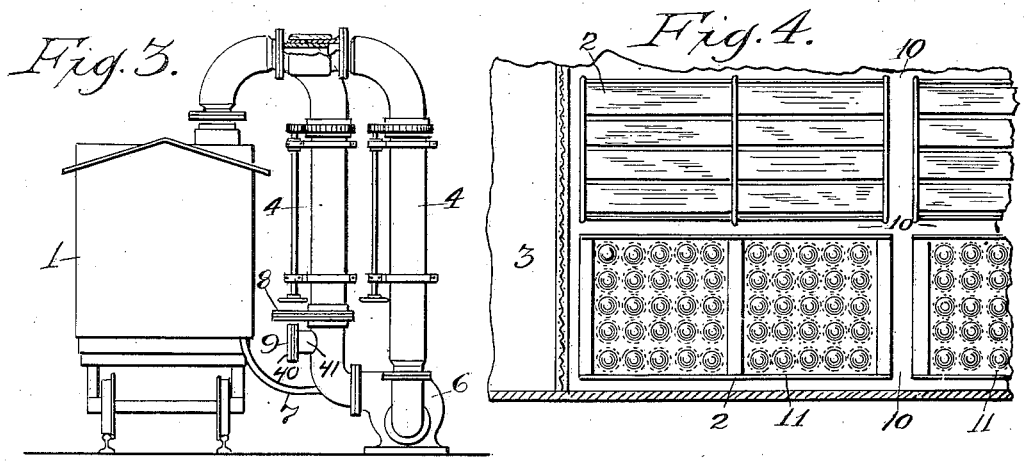
WITNESSES:
INVENTOR.
Almerin R. Sprague
BY
Spear & Seely
ATTORNEYS.

UNITED STATES PATENT OFFICE.

ALMERIN R. SPRAGUE, OF SACRAMENTO, CALIFORNIA, ASSIGNOR, BY MESNE ASSIGNMENTS, TO L. H. ROY, OF CHICAGO, ILLINOIS.

PROCESS FOR TEMPERATURE REGULATION.

No. 880,414.      Specification of Letters Patent.      Patented Feb. 25, 1908.

Application filed March 22, 1906. Serial No. 307,472.

*To all whom it may concern:*

Be it known that I, ALMERIN R. SPRAGUE, citizen of the United States, residing at Sacramento, in the county of Sacramento and State of California, have invented certain new and useful Improvements in Processes for Temperature Regulation, of which the following is a specification.

In connection with the storage and transportation of perishable products or commodities such as fruits, vegetables, etc., it is found to be highly desirable to change the temperature of such products shortly or immediately after the same are packed or prepared for storage or shipment. As, for instance, in many cases it is desirable to cool or lower the temperature of freshly gathered fruit, such as oranges, in order to lessen liability to decay when kept a long time in storage or shipped a long distance while, in other cases, it may be found desirable to raise the temperature of the fruit if it be desired to effect the ripening of the same, or prevent freezing during the period it is in storage or in transportation. More frequently, the lowering of the temperature or the cooling of the product, to aid in the preservation or prevent decay thereof, is required. This is especially true of fruits or like products picked in warm climates and shipped great distances, as from California to the Eastern States, and under such conditions the early or prompt cooling of the fruit after the same is gathered and packed is found to be highly beneficial whether the fruit be shipped under refrigeration or not. The early or prompt cooling of fruit or like product which is to be shipped in a refrigerator car is found to result in the better preservation of the product while in transit because when such product is loaded in the refrigerator car, and the natural temperature thereof is high, as when the fruit has been exposed to the hot sun in a warm climate, a considerable period of time will elapse before the ice or cooling medium in the car will effect the cooling of the fruit, and the latter will for that reason be liable to injury or decay. Moreover, by such prompt preliminary cooling of the fruit or product the same may be shipped in cars without refrigeration to much greater distance than would be possible if the fruit were shipped when at its normal temperature. In this connection it will be observed that the decay of fruit which has been recently picked and packed is frequently greatly hastened by the heat generated in the ripening operation, so that if the fruit be cooled as soon as packed, the ripening process will be arrested and liability of heating and consequent rapid decay correspondingly lessened. As fruit is usually not gathered until nearly ripe, the process of furthering ripening and decay will follow quickly unless the temperature thereof be quickly reduced, thus lessening the liability of continued ripening and early decay.

Efforts have heretofore been made to cool fruit or other perishable products after the same have been packed and placed in a car or other closed space or chamber, by passing a current of cold air through said space or chamber. The use of the current of cold air under these conditions has been found ineffective as a rapid cooling medium, because the current of air follows the passages afforded by the larger spaces or openings between and surrounding the packages containing the product and therefore fails to come into immediate contact with the fruit inclosed in said packages even though the same be apertured or perforated in some manner to provide for ventilation. All such attempts to effect pre-cooling of fruit and the like have proved ineffective, because necessarily slow in operation, rapidity in the cooling process being absolutely necessary in order to obtain practically successful results.

In carrying out my novel process or method I change the temperature of the product by bringing into contact therewith air of temperature different from that of the product, through the interchange of cold or warm air, as the case may be, in the spaces or inclosures within which the products are contained, or throughout the entire space in which the product is placed or packed.

It is a well known fact that when a portion of the air is removed from an inclosed space or closed chamber, the remaining air therein will immediately expand to occupy the place of the air withdrawn, thereby producing a lessened air pressure, or rarefaction of the entire body of air, within said inclosed space or chamber. It follows that a part of the air contained within an apertured box or inclosure, containing the fruit or the like, will flow outwardly from the interior of said inclosure upon the removal of part of the air from the inclosed space or chamber in which said inclosure and its contents are placed. Moreover, if after the production of lessened air pressure or rarefaction of the air within the closed space or chamber, air of different temperature be admitted into said space or chamber, and the normal pressure therein be thereby restored, the incoming air of different temperature will tend to find its way to all parts of said space or chamber and thereby produce an equilibrium of pressure throughout the same. In my novel process or method I utilize the tendency of the air so admitted to a closed space or chamber, after the production of a lessened air pressure therein, to distribute itself uniformly throughout the same, and in carrying out said method or process I continuously and forcibly withrdaw air from such a closed space or chamber in which the product to be treated is contained and admit a supply of air at a desired temperature, as required for cooling or warming, to said chamber, while periodically or intermittently varying or changing the density of the air therein. Such change in the density of the air is most conveniently effected by periodically, or at intervals, admitting to the chamber (the withdrawal of the air therefrom being continuously maintained) a supply of air at a desired temperature. During the periods when the air is being both admitted to and withdrawn from the chamber, a current of air will be maintained through the same and around or between the packages therein contained, with the result of changing the temperature of the air immediately surrounding the packages, as well as that within all other parts of the interior of the chamber, and also of changing the temperature of the exterior portions of packages themselves. Upon the air supply being cut off a lessening of the air pressure or density will be immediately produced in all parts of the chamber, while that portion of the rarefied air which is more directly in the path of the air current will be carried toward the air exit and out of the chamber. At the end of each period of rarefaction, and upon the admission of a fresh supply of attemperated air, the latter will immediately become distributed throughout the entire area of the chamber and will find its way through and into all of the spaces between the packages within the chamber, as well as into the interior of the packages and into the spaces or interstices between the articles contained in said packages. This will continue until the density or pressure of air throughout the chamber and within the packages has become the same as it was before the exhaustion or rarefaction took place. The incoming air having been attemperated and having a desired temperature different from that of the contents of the chamber, the temperature of said contents will be raised or lowered accordingly, and by frequent repetition in the variation of the density of the air accompanied by the constant withdrawal of air from the chamber, the temperature of the contents of the chamber will be rapidly changed to the desired degree or extent. It will be apparent, moreover, that the uniform distribution within the chamber of the incoming air, introduced thereinto, will be due to variation in density of the air in said chamber, and such variation in density may be produced otherwise than by admitting air at atmospheric pressure to a space or chamber, from which air is continuously withdrawn. As, for instance, such variation in density may be produced, or a greater variation in density effected, by continuously withdrawing air from the inclosed space or chamber and at intervals forcing into said space or chamber air at a pressure higher than atmospheric pressure. The desired result of uniform distribution of the incoming air results from the variation of the density of the air within said space or chamber, regardless of the actual pressure within the chamber as compared with atmospheric pressure.

It follows from the above that by maintaining a constant powerful or forcible withdrawal of air from the inclosed space or chamber accompanied by the introduction of attemperated air thereinto and by periodically or intermittently varying the density of the air within the chamber, products within said chamber may be cooled or warmed as desired to prevent the decay thereof from high temperatures, or to prevent injury thereto from exposure to a very low temperature.

The constant withdrawal of air from the interior of the space or chamber is of great importance in the carrying out of the process, as will be understood from consideration of the fact that if the process be used for cooling fruit or other product, the air within the chamber, which has been warmed by absorption of heat from the product therein, will be rapidly and continuously withdrawn therefrom, and during the periods of air-admission rapid circulation through the chamber of the cooled air admitted thereto will be maintained. It will also be understood that during the periods of rarefaction, the warmer air which flows outwardly from the interior of the inclosures or packages within the chamber, will be swept outwardly from the chamber with the outgoing air current, and its place will be taken by the incoming cooled air which will surround said inclosures or packages and will, at the end of each period of rarefaction, flow into the interior of said inclosures or packages and into the interstices between the articles therein. Such cooled air, after having absorbed the heat from the articles, upon the occurrence of the next period of rarefaction will be withdrawn from immediate contact with the articles and from the interior of the inclosures and thereafter discharged from the chamber, as before stated.

An important advantage is gained by maintaining a continuous and forcible withdrawal of air from a car or other storage space or chamber, and quickly or abruptly cutting off the air supply admitted at intervals, because of the fact that there will usually be some leakage of air through the walls of such car or chamber, which seldom can be made perfectly air tight. This will be understood by consideration of the fact that, by reason of such leakage, in order to maintain the lessened air pressure or tension up to the moment of admission of the attemperated air, it is necessary to constantly continue the forcible withdrawal of air from the car or chamber; it being evident that if any interval of time, however brief, were to intervene between the period of rarefaction and the beginning of the introduction of the fresh air supply, the effectiveness of the rarefaction would be lessened or lost by leakage of outside air into the chamber, and the newly introduced air would fail to enter the interior of the boxes or packages. By the continued and forcible withdrawal of air from the chamber, all air entering by leakage is promptly removed, and the entering air will be brought into contact with the boxes or packages, and will be drawn into the same at the end of each period of rarefaction, to cool the contents thereof, as hereinbefore stated.

It will, of course, be understood that in carrying out my process the air introduced into the chamber will be properly attempered. In carrying out my said novel process, moreover, I prefer to direct the attemperated air through a closed circuit formed by air passages of which said chamber constitutes a part, so that the attemperated air may be passed repeatedly through said chamber, the air withdrawn from the chamber, with temperature not greatly changed, being, during the periods of air admission, again returned to the chamber and the loss which would result from continuously heating or cooling a fresh supply of air at extreme temperatures thereby avoided. Moreover, in carrying out my process, when the air so withdrawn from the closed chamber is returned to the same during the periods of air-admission, I prefer to produce the variation in density of the air within the chamber, by cutting off at intervals the admission of air to the chamber, and during the periods when the admission of air is thus cut off, discharging the withdrawn air to the atmosphere. The cutting off of the air supply results in the immediate rarefaction or lessening of air pressure throughout the interior of the chamber, and the distribution throughout all parts of the chamber and in contact with all articles therein, of the attemperated air which is admitted between the periods of rarefaction.

In the accompanying drawings which illustrate one form of mechanism for carrying out the novel process constituting my invention,—Figure 1 is a longitudinal sectional view of a car provided with means and adapted for carrying out my process. Fig. 2 is a plan view of the same. Fig. 3 is an end view. Fig. 4 is a plan view of the interior of a portion of one end of the car with some of the parts broken away to show the contents and an exaggerated view of the surrounding envelop or covering of air.

In the construction shown in the drawings, 1 indicates the body of a car, which may represent an inclosed space or closed chamber of any description, as the storage chamber of a refrigerating plant, the hold of a vessel, etc., 2 the packages therein, as boxes of oranges, which are suitably apertured for ventilation, and 3 the ordinary ice tanks at the ends of the car. The means for circulating the air and varying the pressure or density thereof comprises a conduit 4 of suitable size and construction fixed by the side of the track, which conduit is adapted to be connected with the car at its ends through the openings 5 in the top of the car. A fan or blower 6 is connected with the conduit at any suitable point, preferably near one end, by means of which the air may be circulated continuously through the endless passage or circuit formed by the car and the conduit, or by which air may be exhausted from said car. Pipes 7 preferably lead from the drip pans of the ice chambers to the conduit for assisting in cooling the air, and suitable valves 8 and 9 are provided for changing the mechanism from a circulating to an exhaust apparatus.

When the fan is set in motion the air will be drawn from one end of the car, and if the valve 9 is open and the valve 8 closed, the air from the car will be exhausted into the atmosphere and thereby the tension of the air within the car will be reduced. On the other hand, if the valve 9 be closed and the valve 8 open a circulation of air within the car and the connections will be established, the air circulating in its passage through the ice box. This will serve, however, only to arrest the exhaustion of air within the chamber of the car, but if the valve 9 be also opened and valve 8 remaining open, the air will be forced on its way through the valve passage 8 past the end of the short pipe 41 and into one end of the car, while it is also being exhausted from the other end. But the current of air from the fan directed through the opening or valve 8 will draw in from the atmosphere through the open valve 9 an additional supply of air, thus reducing the tension within the chamber of the car, and restoring more or less the equilibrium of air. By this operation the vacuum or partial vacuum is created within the car and thereafter the air pressure is restored, and this by manipulation of the apparatus, may be repeated at will. The valves may be shifted as frequently as the conditions require.

In practicing my invention, as for shipping oranges and other products from California to the Eastern markets, the fruit is packed in the boxes 2 in the usual manner and arranged in the cars in tiers, with spaces 10 therebetween. The conduit 4 is then attached to the ends of the car and the blower started so as to cause a current of air to be passed through the car from one end to the other. The air passes through the ice tanks at each end and is further cooled by the waste water and the cooled air will be circulated through the open spaces in the car and between the boxes or packages therein. During the whole treatment, air is constantly withdrawn in very large volume from the car, while at intervals the admission of air to the car is cut off, and the moment the entrance of air ceases the pressure of the air surrounding the fruit packages is lessened and the air therein therefore expands and flows outwardly from the interior of the packages. The withdrawn air in part is carried from the chamber by the constant withdrawal of air therefrom and, when after every period or lessened air pressure or rarefaction, the air is again powerfully forced into the chamber a portion of such air enters the packages to replace that withdrawn therefrom during the preceding period of rarefaction. This constant and powerful withdrawal of air permits, without loss of time or power, such change of density, by merely cutting off the ingress of air, at such intervals as is called for by the temperature of the products being treated.

By successively or intermittently varying the density of the air within the car in this manner, and also varying its temperature at the same time, I have found that a car-load of fruit or similar product can be so thoroughly cooled in a few hours that it can be safely shipped across the Continent with or without the usual refrigeration to prevent a rise of temperature within the car, even though it may pass through the hot desert portions of the country.

The prompt and rapid cooling of the fruit before starting it upon its journey permits of the fruit being ripened upon the trees instead of in transit, as heretofore, which gives it the richness and delicacy of flavor secured by natural ripening and which has previously been secured only when the fruit has been consumed near where it has been grown, and which is impossible to secure where, to prevent decay, the fruit had to be shipped before it had been thoroughly ripened on the trees.

The direction of the current through the car can be controlled or varied to a greater or less extent by means of dampers 12 in the icing chambers, and it may be caused to circulate or spread out more evenly throughout the interior of the car and among the boxes or packages therein by obstructions, as baffle boards 13, placed at any desired point between the tiers of packages.

Under some circumstances it is extremely desirable to withdraw the foul gases which even in cold storage conditions form from the slow degeneration of the contents of packages in such storage conditions. I accomplish this in the same manner as above described except that I do not necessarily change the temperature of the air admitted at intervals, which air admitted at intervals in part is drawn from the exterior of the closed conduit during the brief interval used in closing the valve, affording egress to the atmosphere and opening the valve admitting air to the chamber under treatment.

Although I have shown and more particularly described my process as applied to fruit in a car, it is evident that it can be applied equally as well to other things, as meats, vegetables, etc. and in other places, as cold storage chambers, holds of vessels, etc. and I reserve the right to apply it in all places and under all conditions under which it is capable of being used.

I claim as my invention:

1. The process of treating a perishable product, in a closed space, which consists in supplying air to said space, continuously withdrawing air from said space and intermittingly interrupting the supply of air for periodically varying the density of the air therein.

2. The process of treating a perishable product in a closed space, which consists in producing in a closed circuit of which said space forms a part, movement of a body of air, treating the air in said circuit to attemperate the same, and intermittingly varying the admission of air to said space, while maintaining a continuous outflow therefrom.

In testimony whereof I have affixed my signature, in presence of two witnesses, this ninth day of March 1906.

ALMERIN R. SPRAGUE.

Witnesses:
R. L. SHINN,
IRVING NEEDHAM.

It is hereby certified that the name of the assignee in Letters Patent No. 880,414, granted February 25, 1908, upon the application of Almerin R. Sprague, of Sacramento, California, for an improvement in "Processes for Temperature Regulation," was erroneously written and printed "L. H. Roy," whereas said name should have been written and printed *L. A. Roy;* and that the said Letters Patent should be read with this correction therein that the same may conform to the record of the case in the Patent Office.

Signed and sealed this 24th day of March, A. D., 1908.

[SEAL.]

C. C. BILLINGS,
*Acting Commissioner of Patents.*